(12) United States Patent  
Kang et al.

(10) Patent No.: US 11,946,563 B2  
(45) Date of Patent: Apr. 2, 2024

(54) VALVE ACTUATOR

(71) Applicant: LG ELECTRONICS INC., Seoul (KR)

(72) Inventors: Joohang Kang, Seoul (KR); Youngchan Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/872,698

(22) Filed: Jul. 25, 2022

(65) Prior Publication Data

US 2023/0095370 A1 Mar. 30, 2023

(30) Foreign Application Priority Data

Sep. 29, 2021 (KR) .......................... 10-2021-0128764

(51) Int. Cl.  
*F16K 31/524* (2006.01)  
*F16K 31/04* (2006.01)

(52) U.S. Cl.  
CPC ...... *F16K 31/52425* (2013.01); *F16K 31/047* (2013.01)

(58) Field of Classification Search  
CPC ............. F16K 31/52425; F16K 31/047; F16K 31/043; F16K 31/535; F16K 31/53; F16K 31/04; F16K 27/00; F16H 57/02  
See application file for complete search history.

(56) References Cited

U.S. PATENT DOCUMENTS

| | | | | |
|---|---|---|---|---|
| 4,165,658 | A * | 8/1979 | Ueno | F16H 1/20 251/248 |
| 6,173,939 | B1 * | 1/2001 | Dottavio | F16K 1/221 251/305 |
| 6,659,050 | B1 * | 12/2003 | Creech | F01P 7/167 123/41.08 |
| 7,055,795 | B2 * | 6/2006 | Lay | F16K 31/055 251/249.5 |
| 2001/0035510 | A1 * | 11/2001 | Oh | F16K 37/0041 251/129.03 |

(Continued)

FOREIGN PATENT DOCUMENTS

KR 100392198 7/2003  
WO WO2002059515 8/2002

OTHER PUBLICATIONS

Extended European Search Report in European Appln. No. 22187108.0, dated Jan. 30, 2023, 6 pages.

*Primary Examiner* — Patrick C Williams  
(74) *Attorney, Agent, or Firm* — Fish & Richardson P.C.

(57) ABSTRACT

A valve actuator includes a housing, a motor disposed on the housing, a driving gear coupled to a motor shaft of the motor, a transmission gear which is in external contact with the driving gear and rotates according to a predetermined gear ratio when the driving gear rotates, an output shaft including a main body and a plurality of protrusions radially protruding from the main body and spaced apart from each other in a circumferential direction, an output gear coupled to the output shaft and in external contact with the transmission gear, a stopper disposed in the housing and limiting a rotation radius of the output gear, and an elastic member disposed between a lower portion of the plurality of protrusions and a lower plate of the housing.

20 Claims, 10 Drawing Sheets

(56) References Cited

U.S. PATENT DOCUMENTS

2002/0125456 A1* 9/2002 Rauch ................... F16K 31/043
 251/337
2005/0247900 A1* 11/2005 Marsh ................... F16K 31/047
 251/77
2016/0138533 A1 5/2016 Martin et al.

* cited by examiner

VALVE ACTUATOR

CROSS-REFERENCE TO RELATED APPLICATION

This application claims priority to and the benefit of Korean Patent Application No. 10-2021-0128764, filed in the Korean Intellectual Property Office, on Sep. 29, 2021, the entire contents of which are incorporated herein by reference.

BACKGROUND OF THE INVENTION

Field of the Invention

The present disclosure relates to a valve actuator. In more detail, the present disclosure relates to a valve actuator for opening and closing a ball valve.

Description of the Related Art

In general, a ball valve is a type of opening/closing means widely used to supply or block a working fluid flowing through a pipeline coupled to both ends of the valve body to the required place by automatically rotating the ball installed inside the ball valve by driving the motor to open and close the pipeline.

A conventional ball valve actuator connects a motor shaft of a gear motor and an output shaft of a ball valve with a cam, and applies a sensor or a step motor to rotate the output shaft by an intended angle. In this case, a physical stopper is applied to limit the rotation angle of the output shaft.

However, when the torque of the motor is applied while the gear is in contact with the stopper, there is a problem in that the gear is damaged.

In order to solve this, in Korean Patent Registration No. 0392198, the motor is controlled to stop rotating in a state in which the gear is in contact with the stopper through the limiter switch.

In this case, as a configuration of a separate sensor for detecting that the gear is in contact with the stopper, a separate limiter switch, and a separate PCB board for a stop signal are added, there was a problem in that the size of the product increases and the manufacturing cost increases.

PRIOR TECHNICAL LITERATURE (Patent Document 1) Korean Registered Patent Publication No. 10-0392198 B1 (patent published on Jul. 22, 2003)

SUMMARY OF THE INVENTION

The problem to be solved by the present disclosure is to provide a valve actuator capable of preventing a gear from being damaged when a torque of a motor is applied while the gear is in contact with a stopper.

In addition, it is to provide a valve actuator capable of preventing a gear from being damaged without the configuration of a separate sensor for detecting that the gear is in contact with the stopper, a separate limiter switch, or a separate PCB board for a stop signal.

In addition, it is to provide a valve actuator applicable to a DC motor that is cheaper than an AC motor.

In addition, it is to provide a valve actuator capable of reducing the size of the product and reducing the manufacturing cost.

In addition, it is to provide a reusable valve actuator by pressing and turning the output shaft to be in external contact with the released gears.

A valve actuator according to an aspect of the present disclosure for achieving the above object may comprise a housing, a motor disposed on the housing, a driving gear coupled to a motor shaft of the motor, a transmission gear which is in external contact with the driving gear and rotates according to a predetermined gear ratio when the driving gear rotates, an output shaft including a main body and a plurality of protrusions radially protruding from the main body and spaced apart from each other in a circumferential direction, an output gear coupled to the output shaft and in external contact with the transmission gear, a stopper disposed in the housing and limiting a rotation radius of the output gear, and an elastic member disposed between a lower portion of the plurality of protrusions and a lower plate of the housing.

In this case, an upper plate of the housing may include a first hole overlapping the main body in a vertical direction, and a plurality of second holes extending in a radial direction from the first hole, and when the output shaft rotates by a predetermined angle, the main body may pass through the first hole by the elastic member, the plurality of protrusions may pass through the plurality of second holes, and the output gear may be released from the transmission gear.

Through this, when the torque of the motor is applied while the output gear and the stopper are in contact, since the output gear is released from the transmission gear, it is possible to prevent the driving gear, the transmission gear, and the output gear from being damaged.

In addition, it is possible to prevent the gear from being damaged without the configuration of a separate sensor for detecting that the output gear is in contact with the stopper, a separate limiter switch, or a separate PCB board for a stop signal. Through this, it is possible to reduce the size of the product and reduce the manufacturing cost.

In addition, the plurality of protrusions may include a first protrusion and a second protrusion spaced apart from the first protrusion in the circumferential direction, and circumferential angles of the first protrusion, the second protrusion, and first and second separation spaces between the first protrusion and the second protrusion may be 90 degrees, respectively. In this case, circumferential angles of the plurality of second holes, and spaces spaced apart between the plurality of second holes may be 90 degrees, respectively. Through this, it is possible to improve the easiness of manufacturing the output shaft.

In addition, the plurality of protrusions may include first to fourth protrusions spaced apart from each other in the circumferential direction, and circumferential angles of the first to fourth protrusions and spaces spaced apart between the first to fourth protrusions may be 45 degrees, respectively. In this case, a circumferential angle of each of the plurality of second holes may be 135 degrees, and circumferential angles of spaces spaced apart between the plurality of second holes may be 45 degrees, respectively. Through this, it is possible to improve the easiness of manufacturing the output shaft.

In addition, the motor may be a DC motor. In other words, since it can be applied to a DC motor that is cheaper than an AC motor, the manufacturing cost of the product can be reduced.

In addition, the main body of the output shaft may include a groove formed at an upper end. Through this, it is possible to reuse it by pressing and turning the output shaft through a tool such as a screwdriver to be in external contact with the released transmission gear and output gear.

In addition, at least a portion of upper ends of the plurality of protrusions may be formed in a tapered or curved shape. Through this, the plurality of protrusions may easily pass through the plurality of second holes by the elastic member.

In addition, when the output shaft rotates by the predetermined angle, an upper region of the output gear may be in contact with the upper plate of the housing. Through this, it is possible to prevent the output shaft from being separated from the housing.

In addition, an upper end of the main body of the output shaft may be disposed above an upper end of the plurality of protrusions. Through this, it is possible to provide a space in which the external contact of the transmission gear and the output gear may be released.

A valve actuator according to an aspect of the present disclosure for achieving the above object may comprise a housing, a motor disposed on the housing, a driving gear coupled to a motor shaft of the motor, an output shaft including a main body and a plurality of protrusions radially protruding from the main body and spaced apart from each other in a circumferential direction, an output gear coupled to the output shaft and in external contact with the driving gear, a stopper disposed in the housing and limiting a rotation radius of the output gear, and an elastic member disposed between a lower portion of the plurality of protrusions and a lower plate of the housing.

In this case, an upper plate of the housing may include a first hole overlapping the main body in a vertical direction, and a plurality of second holes extending in a radial direction from the first hole, and when the output shaft rotates by a predetermined angle, the main body may pass through the first hole by the elastic member, the plurality of protrusions may pass through the plurality of second holes, and the output gear may be released from the driving gear.

Through this, when the torque of the motor is applied while the output gear and the stopper are in contact, since the output gear is released from the transmission gear, it is possible to prevent the driving gear, the transmission gear, and the output gear from being damaged.

In addition, it is possible to prevent the gear from being damaged without the configuration of a separate sensor for detecting that the output gear is in contact with the stopper, a separate limiter switch, or a separate PCB board for a stop signal. Through this, it is possible to reduce the size of the product and reduce the manufacturing cost.

In addition, the plurality of protrusions may include a first protrusion and a second protrusion spaced apart from the first protrusion in the circumferential direction, and circumferential angles of the first protrusion, the second protrusion, and first and second separation spaces between the first protrusion and the second protrusion may be 90 degrees, respectively. In this case, circumferential angles of the plurality of second holes, and spaces spaced apart between the plurality of second holes may be 90 degrees, respectively. Through this, it is possible to improve the easiness of manufacturing the output shaft.

In addition, the plurality of protrusions may include first to fourth protrusions spaced apart from each other in the circumferential direction, and circumferential angles of the first to fourth protrusions and spaces spaced between the first to fourth protrusions may be 45 degrees, respectively. In this case, a circumferential angle of each of the plurality of second holes may be 135 degrees, and circumferential angles of spaces spaced apart between the plurality of second holes may be 45 degrees, respectively. Through this, it is possible to improve the easiness of manufacturing the output shaft.

In addition, the motor may be a DC motor. In other words, since it can be applied to a DC motor that is cheaper than an AC motor, the manufacturing cost of the product can be reduced.

In addition, the main body of the output shaft may include a groove formed at an upper end. Through this, it is possible to reuse it by pressing and turning the output shaft through a tool such as a screwdriver to be in external contact with the released transmission gear and output gear.

In addition, at least a portion of upper ends of the plurality of protrusions may be formed in a tapered or curved shape. Through this, the plurality of protrusions may easily pass through the plurality of second holes by the elastic member.

In addition, when the output shaft rotates by the predetermined angle, an upper region of the output gear may be in contact with the upper plate of the housing. Through this, it is possible to prevent the output shaft from being separated from the housing.

In addition, an upper end of the main body of the output shaft may be disposed above an upper end of the plurality of protrusions. Through this, it is possible to provide a space in which the external contact of the transmission gear and the output gear may be released.

Through the present disclosure, it is possible to provide a valve actuator capable of preventing a gear from being damaged when a torque of a motor is applied while the gear is in contact with a stopper.

In addition, it is possible to provide a valve actuator capable of preventing the gear from being damaged without the configuration of a separate sensor for detecting that the gear is in contact with the stopper, a separate limiter switch, or a separate PCB board for a stop signal.

In addition, it is possible to provide a valve actuator applicable to a DC motor that is cheaper than an AC motor.

In addition, it is possible to provide a valve actuator capable of reducing the size of the product and reducing the manufacturing cost.

In addition, it is possible to provide a reusable valve actuator by pressing and turning the output shaft to be in external contact with the released gears.

DETAILED DESCRIPTION OF THE EMBODIMENTS

Figure 1:
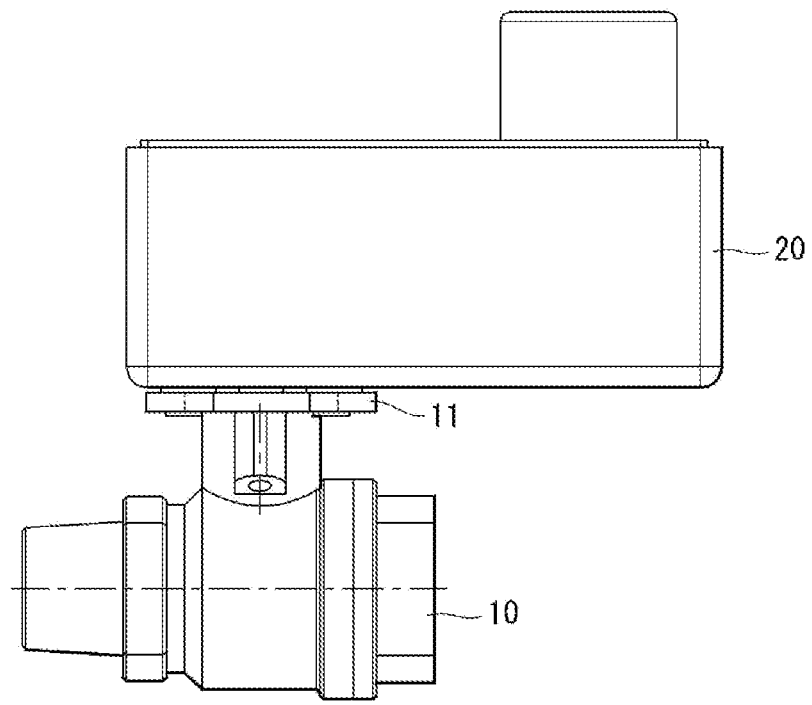
FIG. 1 is a front view of a ball valve and a valve actuator according to an embodiment of the present disclosure.

Hereinafter, embodiments disclosed in the present disclosure will be described in detail with reference to the accompanying drawings, however, regardless of the reference numerals, the same or similar components will be given the same reference numerals and redundant description thereof will be omitted.

In describing the embodiments disclosed in the present disclosure, when a component is referred to as being "connected" or "accessed" to other component, it may be directly connected or accessed to the other component, however, it may be understood that other components may be present in the middle.

In addition, in describing the embodiments disclosed in the present disclosure, when it is determined that the detailed description of the related known technology may obscure the subject matter of the embodiments disclosed in the present disclosure, the detailed description thereof will be omitted. In addition, the accompanying drawings are only for easily understanding the embodiments disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

On the other hand, terms of disclosure may be replaced with terms such as document, specification, description.

Figure 2:
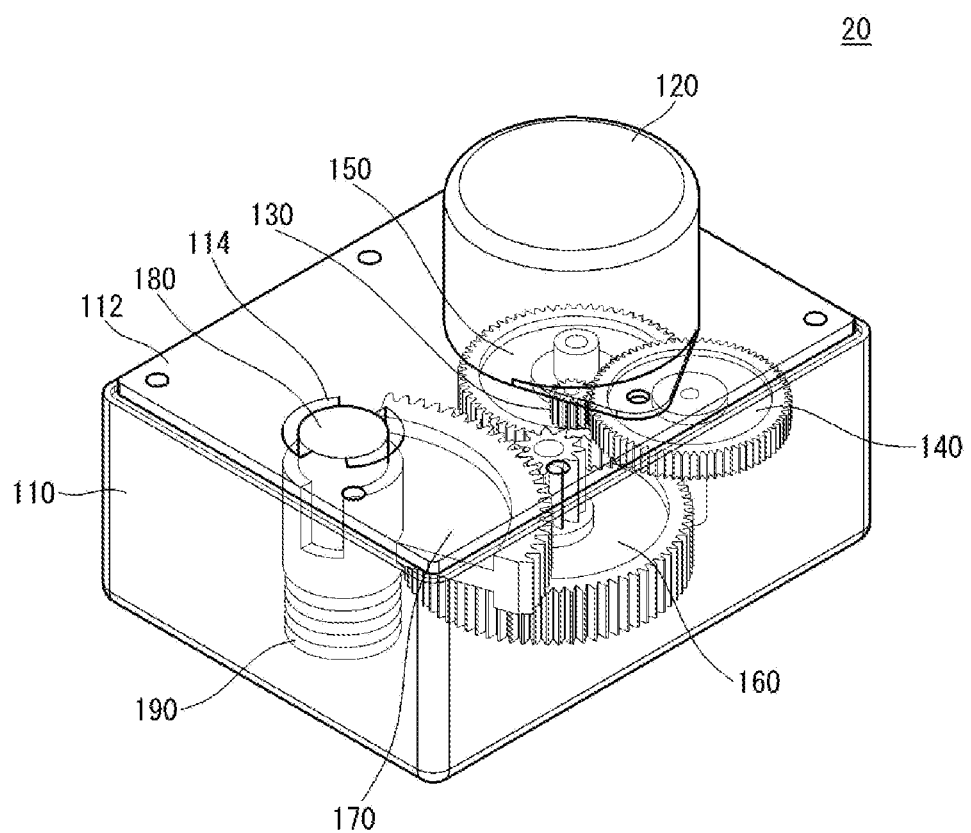
FIG. 2 is a perspective view of a valve actuator according to an embodiment of the present disclosure.
Figure 3:
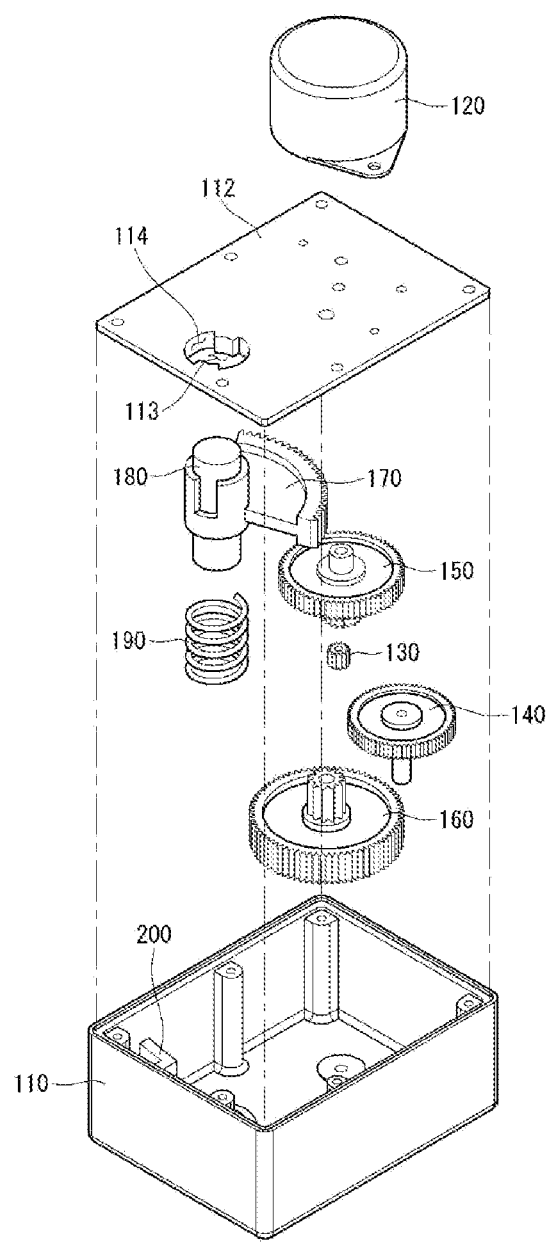
FIG. 3 is an exploded perspective view of a valve actuator according to an embodiment of the present disclosure.
Figure 4:
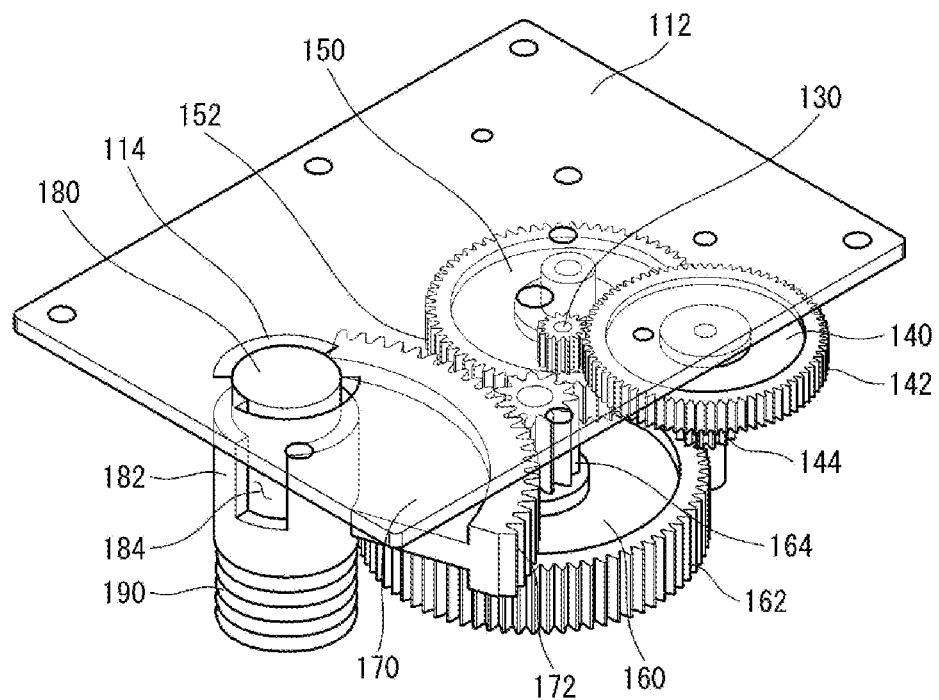
FIGS. 4 and 5 are perspective views in which some components of a valve actuator according to an embodiment of the present disclosure are removed.
Figure 5:
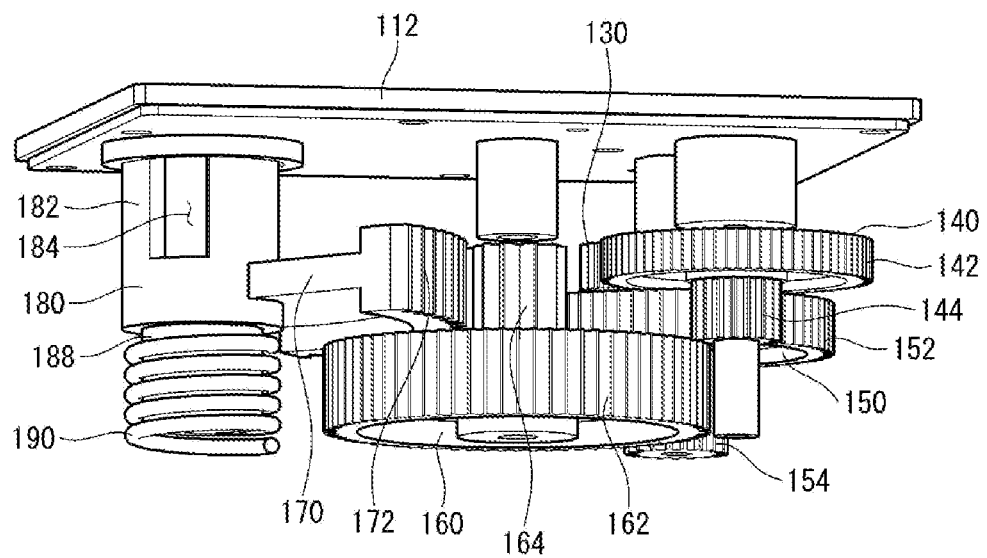
Figure 6:
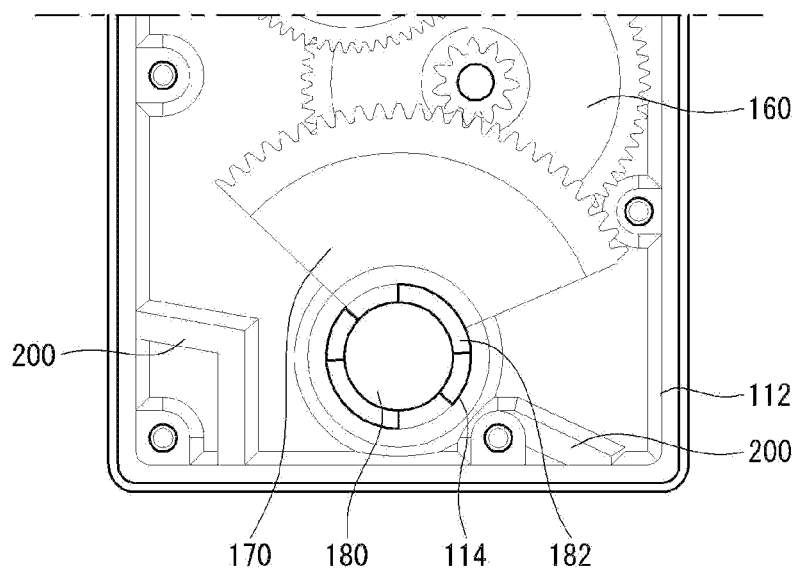
FIG. 6 is a plan view of a partial configuration of a valve actuator according to an embodiment of the present disclosure.
Figure 7:
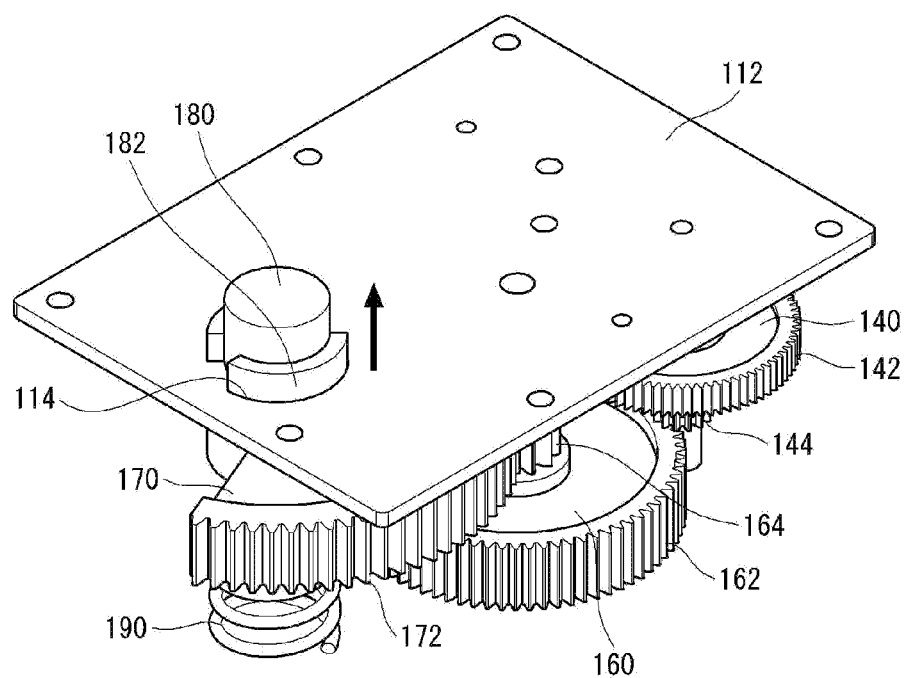
FIGS. 7 to 9 are operation diagrams according to an embodiment of the present disclosure.
Figure 8:
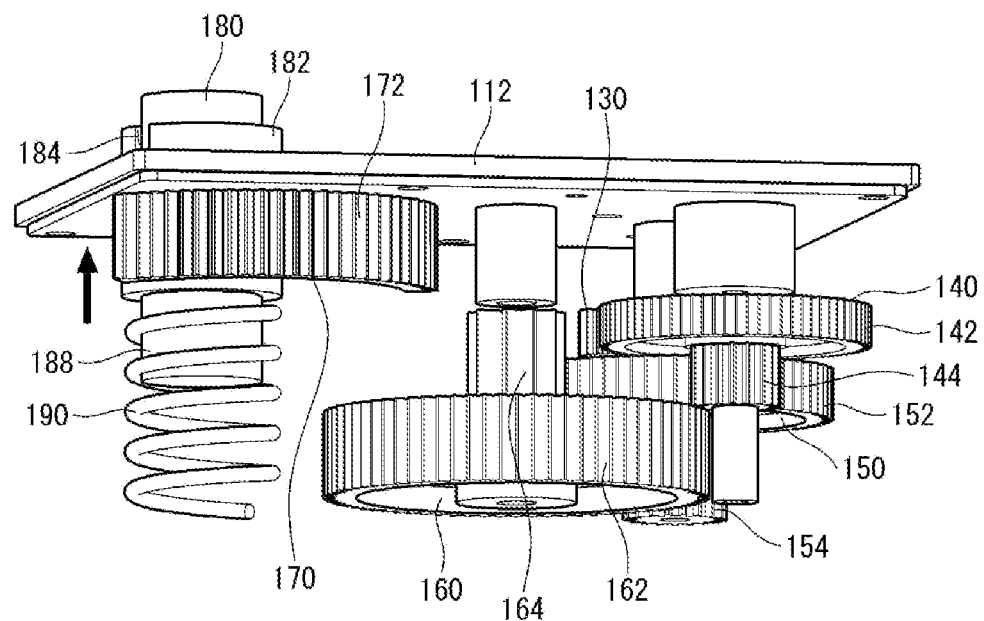
Figure 9:
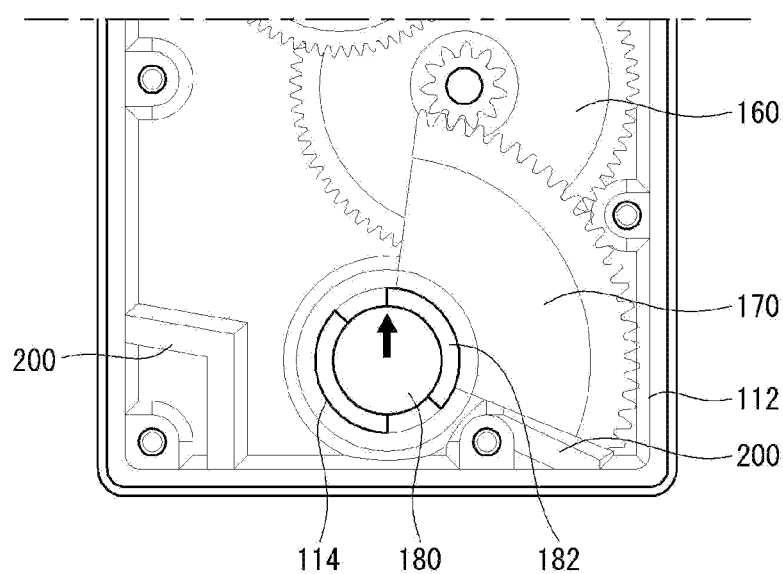
Figure 10:
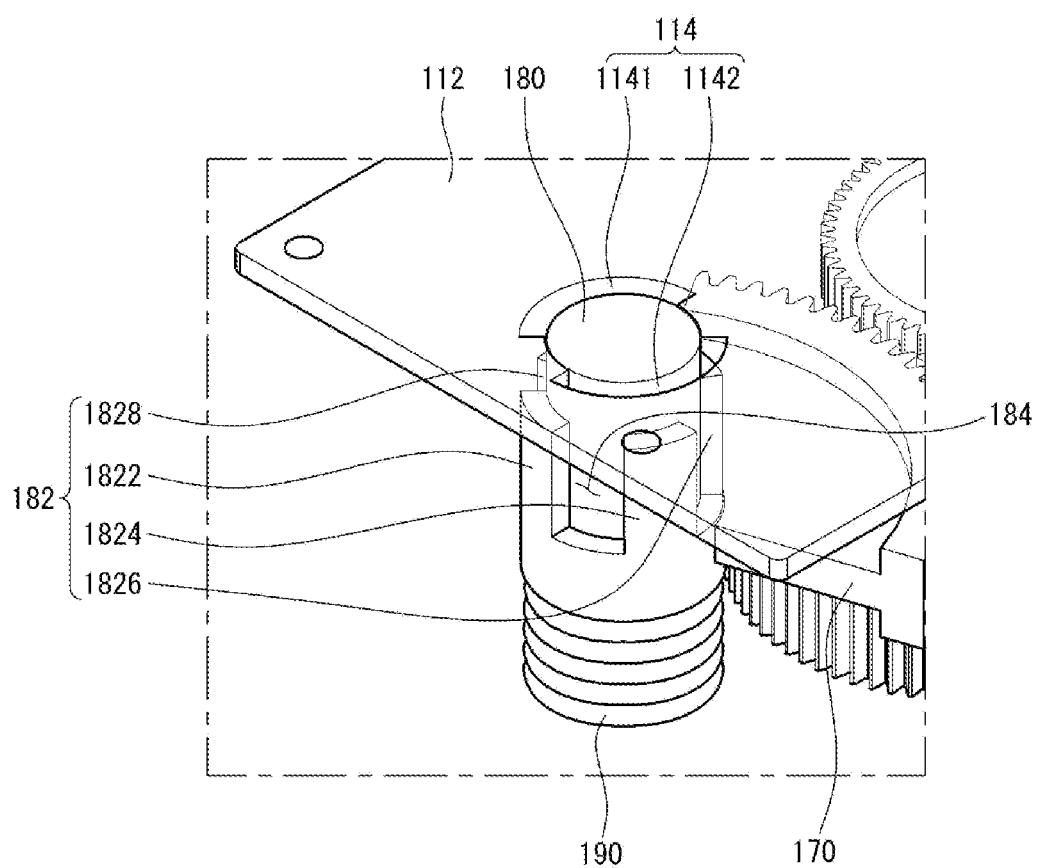
FIG. 10 is a perspective view of a modified example of some configuration of a valve actuator according to an embodiment of the present disclosure.
Figure 11:
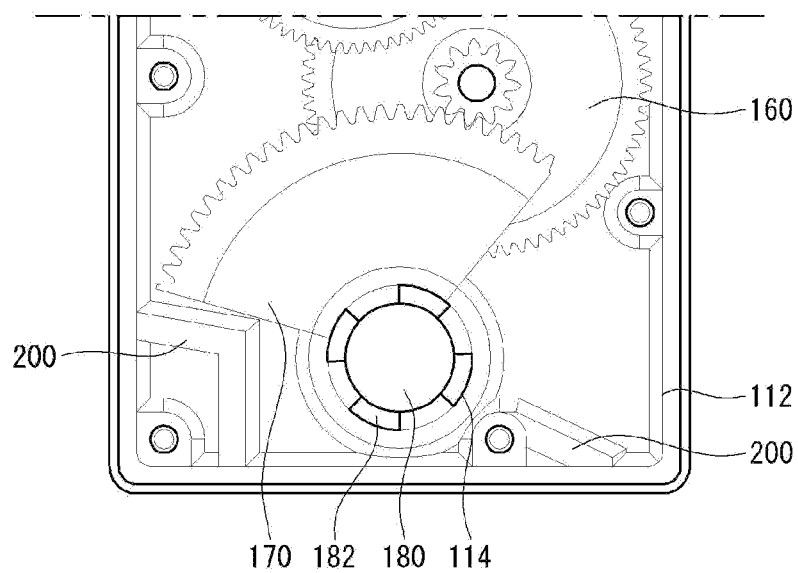
FIGS. 11 and 12 are operation diagrams of a modified example of a valve actuator according to an embodiment of the present disclosure.
Figure 12:
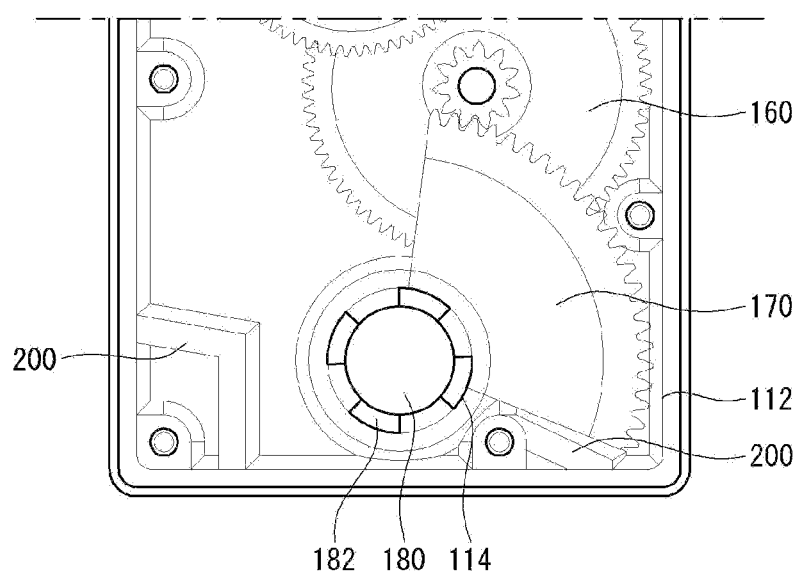
Figure 13:
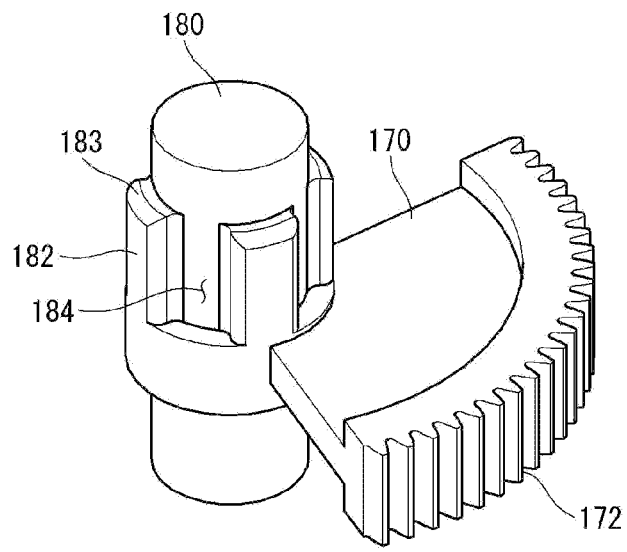
FIG. 13 is a perspective view of a modified example of an output gear and an output shaft of a valve actuator according to another embodiment of the present disclosure.
Figure 14:
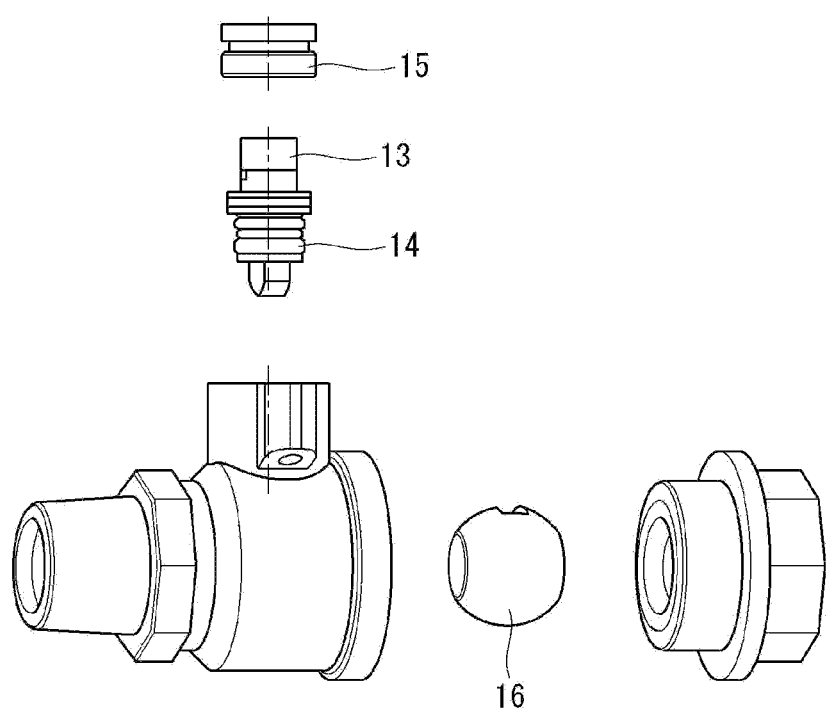
FIG. 14 is an exploded perspective view of a ball valve according to an embodiment of the present disclosure.
Figure 15:
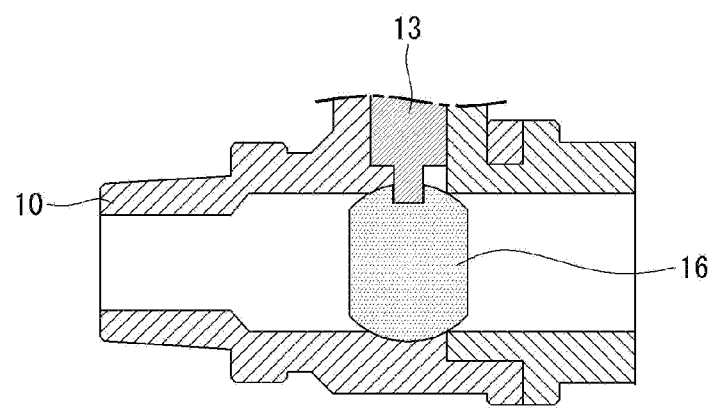
FIGS. 15 and 16 are operation diagrams of a ball valve according to an embodiment of the present disclosure.
Figure 16:
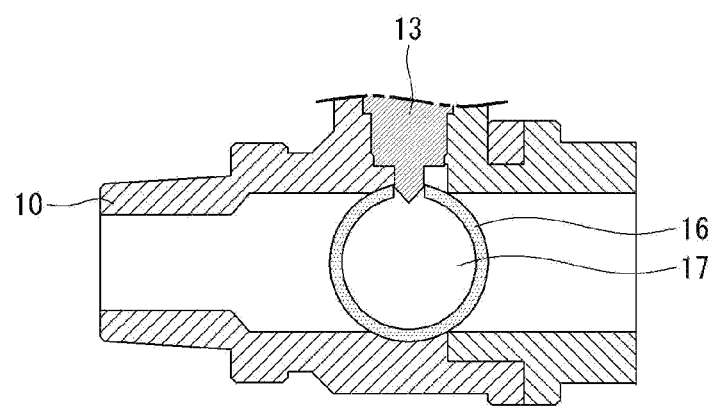

FIG. 1 is a front view of a ball valve and a valve actuator according to an embodiment of the present disclosure. FIG. 2 is a perspective view of a valve actuator according to an embodiment of the present disclosure. FIG. 3 is an exploded perspective view of a valve actuator according to an embodiment of the present disclosure. FIGS. 4 and 5 are perspective views in which some components of a valve actuator according to an embodiment of the present disclosure are removed. FIG. 6 is a plan view of a partial configuration of a valve actuator according to an embodiment of the present disclosure. FIGS. 7 to 9 are operation diagrams according to an embodiment of the present disclosure. FIG. 10 is a perspective view of a modified example of some configuration of a valve actuator according to an embodiment of the present disclosure. FIGS. 11 and 12 are operation diagrams of a modified example of a valve actuator according to an embodiment of the present disclosure. FIG. 13 is a perspective view of a modified example of an output gear and an output shaft of a valve actuator according to another embodiment of the present disclosure. FIG. 14 is an exploded perspective view of a ball valve according to an embodiment of the present disclosure. FIGS. 15 and 16 are operation diagrams of a ball valve according to an embodiment of the present disclosure.

Referring to FIGS. 1 to 16, a valve actuator 20 according to an embodiment of the present disclosure may include a housing 110, a motor 120, a driving gear 130, transmission gears 140, 150, 160, an output gear 170, an output shaft 180, an elastic member 190, and a stopper 200, but may be implemented except for some of these configurations, and does not exclude additional configurations other than this.

The valve actuator 20 may be coupled to an upper portion of a plate 11 coupled to an upper portion of a ball valve 10. The output shaft 180 of the actuator 20 may be coupled to a stem 13 of the ball valve 10. As the output shaft 180 of the actuator 20 rotates, the stem 13 rotates, and a ball 16 of the ball valve 10 rotates to open and close the ball valve 10.

For example, referring to FIG. 14, the ball 16 of the ball valve 10 may include a coupling groove to which a lower portion of the stem 13 is coupled, and a long hole 17. In this case, when the long hole 17 of the ball 16 is not disposed in a traveling direction of a flow path due to the rotation of the output shaft 180 and the stem 13, the ball valve 10 may be closed.

Referring to FIG. 15, the long hole 17 of the ball 16 in the basic state may be placed in the traveling direction of the flow path in the ball valve 10. In this case, the fluid passing through the inside of the ball valve 10 may pass through the long hole 17.

Referring to FIG. 16, as the output shaft 180 rotates, the stem 13 and the ball 16 rotate so that the long hole 17 may not be placed in the traveling direction of the flow path in the ball valve 10. In this case, since the fluid passing through the inside of the ball valve 10 does not pass through the long hole 17, the ball valve 10 may block the fluid passing through the inside of the ball valve 10.

The ball valve 10 may include a stem fixing portion 15 for coupling the stem 13 and an O-ring 14 disposed under the stem 13.

The housing 110 may be formed in a hexahedral shape. The housing 110 may form the exterior of the valve actuator 20. The housing 110 may be disposed on one side of the ball valve 10. The housing 110 may be disposed on the ball valve 10. The motor 120, the driving gear 130, the transmission gears 140, 150, 160, the output gear 170, the output shaft 180, the elastic member 190, and the stopper 200 may be disposed in the housing 110.

The housing 110 may include an upper plate 112. The motor 120 may be coupled to the upper plate 112 of the housing 110. The upper plate 112 of the housing 110 may be penetrated by a motor shaft of the motor 120. The upper plate 112 of the housing 110 may include holes 113 and 114 that vertically overlap the output shaft 180.

The holes 113 and 114 may include a first hole 113 and a plurality of second holes 114 extending radially or horizontally from the first hole 113.

The first hole 113 may overlap a main body of the output shaft 180 in a vertical direction. The first hole 113 may be formed in a shape corresponding to the cross-sectional shape of the main body of the output shaft 180. In one embodiment of the present disclosure, the first hole 113 is described as an example formed in a circular shape, but the present disclosure is not limited thereto and may be variously changed according to the cross-sectional shape of the main body of the output shaft 180.

The plurality of second holes 114 may vertically overlap a plurality of protrusions 182 of the output shaft 180. The plurality of second holes 114 may be formed in a shape corresponding to the cross-sectional shape of the plurality of protrusions 182 of the output shaft 180. The number of the plurality of second holes 114 may be formed to correspond to the number of the plurality of protrusions 182 of the output shaft 180.

The motor 120 may be disposed on the housing 110. The motor 120 may be coupled to the upper plate 112 of the housing 110, and the motor shaft of the motor 120 may pass through the housing 110 and be disposed inside the housing 110. Through this, space efficiency may be improved. The driving gear 130 may be coupled to the motor shaft of the motor 120.

The motor 120 may be a DC motor. The motor 120 may be an AC motor, but in a case of the DC motor, it is possible to reduce the manufacturing cost of the valve actuator 20 compared to the AC motor. In a case of the DC motor, the accuracy of rotation number control is lower than that of the AC motor, but it can be supplemented by the physical stopper 200 of the valve actuator 20.

The driving gear 130 may be coupled to the motor shaft of the motor 120. The driving gear 130 may rotate in one direction when the motor shaft of the motor 120 rotates in one direction, and rotate in the other direction when the motor shaft rotates in the other direction. The driving gear 130 may be in external contact with the transmission gears 140, 150, and 160. The driving gear 130 may be an external gear.

The transmission gears 140, 150, 160 may be in external contact with the driving gear 130. The transmission gears 140, 150, and 160 may rotate according to a predetermined gear ratio when the driving gear 130 rotates. The transmission gears 140, 150, and 160 may be in external contact with the output gear 170. The transmission gears 140, 150, and 160 may reduce the speed of the driving gear 130 by a predetermined gear ratio and transmit it to the output gear 170. Through this, the transmission gears 140, 150, and 160 may increase the torque transmitted from the driving gear 130 and transmit it to the output gear 170.

The transmission gears 140, 150, 160 may include a first gear 140, a second gear 150, and a third gear 160.

The first gear 140 may be in external contact with the driving gear 130. The first gear 140 may be in external contact with the second gear 150. The first gear 140 may be in external contact with the driving gear 130 to be rotated at a predetermined gear ratio with respect to the driving gear 130, and may be in external contact with the second gear 150 to rotate the second gear 150 at a predetermined gear ratio with respect to the first gear 140.

The first gear 140 may include a first external gear 142 and a second external gear 144.

The first external gear 142 may be in external contact with the driving gear 130. Through this, the first gear 140 may rotate at a predetermined gear ratio with respect to the driving gear 130. The first external gear 142 may be disposed on one side of the second external gear 144. For example, the first external gear 142 may be disposed above the second external gear 144.

The second external gear 144 may be vertically spaced apart from the first external gear 142. The second external gear 144 may be disposed on the other side of the first external gear 142. For example, the second external gear 144 may be disposed under the first external gear 142. Through this, space efficiency can be improved. A radial size of the second external gear 144 may be smaller than a radial size of the first external gear 142. The second external gear 144 may be in external contact with the second gear 150. The second external gear 144 may rotate the second gear 150 at a predetermined gear ratio with respect to the first gear 140.

The second gear 150 may be in external contact with the first gear 140. The second gear 150 may be in external contact with the third gear 160. The second gear 150 may be in external contact with the first gear 140 to be rotated at a predetermined gear ratio with respect to the first gear 140, and may be in external contact with the third gear 160 to rotate the third gear 160 at a predetermined gear ratio with respect to the second gear 150.

The second gear 150 may include a third external gear 152 and a fourth external gear 154. The third external gear 152 may be in external contact with the second external gear 144 of the first gear 140, and the fourth external gear 154 may be in external contact with the third gear 160. The third external gear 152 and the fourth external gear 154 may be vertically spaced apart from each other. Through this, space efficiency can be improved. A radial size of the fourth external gear 154 may be smaller than a radial size of the third external gear 152.

The third gear 160 may be in external contact with the second gear 150. The third gear 160 may be in external contact with the output gear 170. The third gear 160 may be in external contact with the second gear 150 to be rotated at a predetermined gear ratio with respect to the second gear 150, and may be in external contact with the output gear 170 to rotate the output gear 170 at a predetermined gear ratio with respect to the third gear 160.

The third gear 160 may include a fifth external gear 162 and a sixth external gear 164. The fifth external gear 162 may be in external contact with the fourth external gear 154 of the second gear 150, and the sixth external gear 164 may be in external contact with the output gear 170. The fifth external gear 162 and the sixth external gear 164 may be vertically spaced apart from each other. Through this, space efficiency can be improved. A radial size of the fifth external gear 162 may be greater than a radial size of the sixth external gear 164.

In the embodiment of the present disclosure, the transmission gears 140, 150, 160 are described as an example consisting of three gears, but the transmission gears 140, 150, 160 may be understood to include one or more gears.

The output gear 170 may be in external contact with the transmission gears 140, 150, 160. The output gear 170 may be coupled to the output shaft 180. The output gear 170 may have a rotation radius limited by the stopper 200. The output gear 200 may be rotated in one direction or the other direction by the transmission gears 140, 150, and 160 to rotate the output shaft 180 in one direction or the other direction.

The output shaft 180 may be disposed in the housing 110. The output shaft 180 may pass through the housing 110, and one end may be coupled to the output gear 170, and the other end may be coupled to the stem 13 of the ball valve 10. The output shaft 180 may be rotated in one direction or the other direction by the output gear 170 to rotate the stem 13 of the ball valve 10 in one direction or the other direction. Through this, the ball valve 10 may be opened and closed.

The output shaft 180 may include the main body, the plurality of protrusions 182 radially protruding from the main body and circumferentially spaced apart from the main body, a separation space 184 formed between the plurality of protrusions 182, and a coupling portion 188 extending downward from the main body. The coupling portion 188 may be formed to be smaller than the radius of the main body of the output shaft 180. The coupling portion 188 may be formed in a cylindrical shape.

The main body of the output shaft 180 may be formed in a cylindrical shape. The main body of the output shaft 180 may vertically overlap the first hole 113. The cross-sectional shape of the main body of the output shaft 180 may be formed to have a shape corresponding to the shape of the first hole 113.

The plurality of protrusions 182 may protrude from the main body in a radial direction. Each of the plurality of protrusions 182 may be formed in an arc shape. The plurality of protrusions 182 may be spaced apart from each other in the circumferential direction. Each of the plurality of protrusions 182 may be formed in a shape corresponding to each of the plurality of second holes 114.

When the output shaft 180 is rotated by a predetermined angle by the output gear 170, the output gear 170 may be in contact with the stopper 200 to limit the rotation radius. In this case, the main body of the output shaft 180 may pass through the first hole 113 of the upper plate 112 of the housing 110 by the elastic member 190, and the plurality of protrusions 182 may pass through the plurality of second holes 114. That is, the output shaft 180 moves upward so that the output gear 170 may be released from external contact with the transmission gears 140, 150, and 160. Through this, when the torque of the motor 120 is applied while the output gear 170 is in contact with the stopper 200, since the output gear 170 is released from external contact with the transmission gears 140, 150, 160, it is possible to prevent the driving gear 130, the transmission gears 140, 150, 160, and the output gear 170 from being damaged.

In addition, since it is possible to prevent the driving gear 130, the transmission gears 140, 150, 160, and the output gear 170 from being damaged without the configuration of a separate sensor for detecting that the output gear 170 is in contact with the stopper 200, a separate limiter switch, or a separate PCB board for a stop signal, it is possible to reduce the size of the product and reduce the manufacturing cost.

The main body of the output shaft 180 may include a groove (not shown) formed on an upper end or upper surface. The groove of the main body of the output shaft 180 may be concave downwardly from the upper end or upper surface of the main body. Through this, it is possible to reuse the valve actuator 20 by pressing and turning the output shaft 180 through a tool such as a screwdriver to be in external contact with the released transmission gears 140, 150, 160 and output gear 170.

Referring to FIG. 13, at least a portion of an upper end or an upper region of the plurality of protrusions 182 may be formed in a tapered or curved shape. For example, a radially outer region of the upper region of the plurality of protrusions 182 may be a tapered region 183. Through this, the plurality of protrusions 182 may easily pass through the plurality of second holes 114 by the elastic member 190. In addition, when there is a tolerance between the plurality of protrusions 182 and the plurality of second holes 114, this may be compensated.

When the output shaft 180 is rotated by a predetermined angle by the output gear 170, the upper region or upper surface of the output gear 170 may be in contact with the lower surface of the upper plate 112 of the housing 110. Through this, it is possible to prevent the output shaft 180 from being separated from the housing 110 by the elastic member 190.

The upper end or upper surface of the main body of the output shaft 180 may be disposed above the upper end or upper surface of the plurality of protrusions 182. Through this, it is possible to provide a space in which the external contact of the transmission gears 140, 150, 160 and the output gear 170 may be released.

The plurality of protrusions 182 may include a first protrusion and a second protrusion spaced apart from the first protrusion in the circumferential direction. Contrary to that shown in FIGS. 2 to 9, circumferential angles of the first protrusion and the second protrusion, and first and second separation spaces between the first protrusion and the second protrusion may be 90 degrees, respectively. In this case, circumferential angles of the plurality of second holes 114, and spaces spaced apart between the plurality of second holes 114 may be 90 degrees, respectively. Through this, it is possible to improve the easiness of manufacturing the output shaft 180.

Referring to FIGS. 10 to 13, the plurality of protrusions 182 may include first to fourth protrusions 1822, 1824, 1826, and 1828 spaced apart from each other in the circumferential direction. Circumferential angles of the first to fourth protrusions 1822, 1824, 1826, and 1828 and spaces spaced apart between the first to fourth protrusions 1822, 1824, 1826, and 1828 may be 45 degrees, respectively. In this case, a circumferential angle of each of the plurality of second holes 1141 and 1142 may be 135 degrees, and circumferential angles of spaces spaced apart between the plurality of second holes 1141 and 1142 may be 45 degrees, respectively. Through this, it is possible to improve the easiness of manufacturing the output shaft 180. In this case, unlike described above, the number of the plurality of protrusions 182 may be four, and the number of the plurality of second holes 1141 and 1142 may be two.

The elastic member 190 may be disposed between a lower portion of the plurality of protrusions 182 and a lower plate of the housing 110. For example, the elastic member 190 may be a spring surrounding the coupling portion 188. In a state in which the transmission gears 140, 150, 160 and the output gear 170 are in external contact with each other, the elastic member 190 may be in a compressed state between the lower portion or lower surface of the plurality of protrusions 182 and an upper surface of the lower plate of the housing 110. In a state in which the output gear 170 and the output shaft 180 rotate by a predetermined angle so that the output gear 170 is in contact with the stopper 200, the elastic member 190 pushes the plurality of protrusions 182 upward so that the main body of the output shaft 180 and the plurality of protrusions 182 may pass through the first hole 113 and the plurality of second holes 114, respectively.

The stopper 200 may be disposed in the housing 110. The stopper 200 may be formed on an inner surface of the housing 110. The stopper 200 may be disposed within the rotation radius of the output gear 170. The stopper 200 may limit a rotation angle of the output gear 170.

Referring to FIGS. 6 to 9, an operation of the valve actuator 20 according to an embodiment of the present disclosure will be described.

Assuming that FIG. 6 is in an initial state, in the initial state, the inside of the ball valve 10 may be in an open state. In this case, only a portion of the plurality of protrusions 182 of the main body 180 may vertically overlap the plurality of second holes 114, or the plurality of protrusions 182 may not vertically overlap the plurality of second holes 114.

As shown in FIGS. 7 to 9, when the motor 120 rotates the driving gear 130 in one direction, the first gear 140 in external contact with the driving gear 130 is rotated in the other direction, the second gear 150 in external contact with the first gear 140 is rotated in one direction, the third gear 160 in external contact with the second gear 150 is rotated in the other direction, the output gear 170 in external contact with the third gear 160 is rotated in one direction, and the output shaft 180 coupled to the output gear 170 is rotated in one direction to make the inside of the ball valve 10 closed. In this case, the rotation radius of the output gear 170 is limited by the stopper 190 to prevent damage to the ball valve 10.

Even when the inside of the ball valve 10 is in a closed state, the motor 120 may continue to operate. In this case, the plurality of protrusions 182 of the output shaft 180 and the plurality of second holes 114 of the upper plate 112 of the housing 110 overlap in a vertical direction, and the elastic member 190 pushes the plurality of protrusions 182 upward so that the main body of the output shaft 180 and the plurality of protrusions 182 may pass through the first hole 113 and the plurality of second holes 114, respectively. That is, since the external contacts of the output gear 170 and the transmission gears 140, 150, and 160 are released, it is possible to prevent damage to the driving gear 130, the transmission gears 140, 150, 160, and the output gear 170 that may occur when the motor 200 continues to operate.

Referring to FIGS. 10 to 12, an operation of a modified example of the valve actuator 20 according to an embodiment of the present disclosure will be described.

Referring to FIG. 10, in the initial state in which the inside of the ball valve 10 is in an open state, at least a portion of the plurality of protrusions 182 of the main body 180 may not vertically overlap the plurality of second holes 114.

Referring to FIG. 11, when the motor 120 rotates the driving gear 130 in the other direction, the first gear 140 in external contact with the driving gear 130 is rotated in one direction, the second gear 150 in external contact with the first gear 140 is rotated in the other direction, the third gear 160 in external contact with the second gear 150 is rotated in one direction, the output gear 170 in external contact with the third gear 160 is rotated in the other direction, and the output shaft 180 coupled to the output gear 170 is rotated in the other direction to make the inside of the ball valve 10 closed. In this case, the rotation radius of the output gear 170 is limited by the stopper 190 to prevent damage to the ball valve 10.

Referring to FIG. 12, when the motor 120 rotates the driving gear 130 in one direction, the first gear 140 in external contact with the driving gear 130 is rotated in the other direction, the second gear 150 in external contact with the first gear 140 is rotated in one direction, the third gear 160 in external contact with the second gear 150 is rotated in the other direction, the output gear 170 in external contact with the third gear 160 is rotated in one direction, and the output shaft 180 coupled to the output gear 170 is rotated in one direction to make the inside of the ball valve 10 closed. In this case, the rotation radius of the output gear 170 is limited by the stopper 190 to prevent damage to the ball valve 10.

Even when the inside of the ball valve 10 is in a closed state, the motor 120 may continue to operate. In this case, the plurality of protrusions 182 of the output shaft 180 and the plurality of second holes 114 of the upper plate 112 of the housing 110 may overlap in the vertical direction. For example, the first protrusion 1822, the fourth protrusion 1828, and a space between the first protrusion 1822 and the fourth protrusion 1828 may all overlap 2-1 protrusion 1141 in the vertical direction, and the second protrusion 1824, the third protrusion 1826, and a space between the second protrusion 1824 and the third protrusion 1826 may all overlap 2-2 protrusion 1142 in the vertical direction.

In this case, the elastic member 190 pushes the plurality of protrusions 182 upward so that the main body of the output shaft 180 and the plurality of protrusions 182 may pass through the first hole 113 and the plurality of second holes 114, respectively. That is, since the external contacts of the output gear 170 and the transmission gears 140, 150, and 160 are released, it is possible to prevent damage to the driving gear 130, the transmission gears 140, 150, 160, and the output gear 170 that may occur when the motor 200 continues to operate.

A valve actuator according to another embodiment of the present disclosure may include a housing 110, a motor 120 disposed on the housing 110, a driving gear 130 coupled to a motor shaft of the motor 120, an output shaft 180 including a main body and a plurality of protrusions 182 radially protruding from the main body and spaced apart from each other in the circumferential direction, an output gear 170 coupled to the output shaft 180 and in external contact with the driving gear 130, a stopper 200 disposed in the housing 110 and limiting a rotation radius of the output gear 170, and an elastic member 190 disposed between a lower portion of the plurality of protrusions 182 and a lower plate of the housing 110.

In this case, an upper plate 112 of the housing 110 may include a first hole 113 overlapping the main body of the output shaft 180 in the vertical direction, and a plurality of second holes 114 extending from the first hole 113 in the radial direction, and when the output shaft 180 is rotated by a predetermined angle, the main body of the output shaft 180 may pass through the first hole 113 by the elastic member 190, the plurality of protrusions 182 may pass through the plurality of second holes 114, and the output gear 170 may be released from the external contact with the driving gear 130.

That is, the valve actuator according to another embodiment of the present disclosure may be interpreted as the transmission gears 140, 150, 160 are excluded from the valve actuator 20 according to an embodiment of the present disclosure.

Through this, it is possible to reduce the cost of the product by simplifying the configuration of the valve actuator.

Some or other embodiments of the present disclosure described above are not exclusive or distinct from one another. Some or other embodiments of the present disclosure described above may be used in combination or combined with each configuration or function.

For example, it means that configuration A described in specific embodiments and/or drawings and configuration B described in other embodiments and/or drawings may be combined. In other words, even when the combination between the components is not described directly, it means that the combination is possible except when it is described as not possible to combine.

The above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

What is claimed is:

1. A valve actuator comprising:
   a housing comprising an upper plate and a lower plate that are spaced apart from each other in a vertical direction;
   a motor disposed at the housing, the motor having a motor shaft;
   a driving gear coupled to the motor shaft of the motor;
   a transmission gear that is in contact with the driving gear, the transmission gear being configured to, based on rotation of the driving gear, rotate according to a predetermined gear ratio to the driving gear;
   an output shaft comprising a main body and a plurality of protrusions, the plurality of protrusion radially protruding from the main body and being spaced apart from each other in a circumferential direction of the main body;

an output gear that is coupled to the output shaft and in contact with the transmission gear;

a stopper disposed in the housing and configured to limit a rotation angle of the output gear; and an elastic member disposed between a lower portion of the plurality of protrusions and the lower plate of the housing, the elastic member being configured to push the main body and the plurality of protrusions through the upper plate of the housing to thereby release the output gear from the transmission gear based on the output shaft rotating by a predetermined angle, wherein the upper plate of the housing defines:
a first hole configured to receive the main body in the vertical direction based on the output shaft rotating by the predetermined angle, and
a plurality of second holes that extend in a radial direction from the first hole and are configured to receive the plurality of protrusions in the vertical direction based on the output shaft rotating by the predetermined angle.

2. The valve actuator of claim 1, wherein the plurality of protrusions include a first protrusion and a second protrusion that are spaced apart from each other in the circumferential direction and arranged about a center of the main body such that a first separation space and a second separation space are defined between the first protrusion and the second protrusion, wherein each of the first protrusion and the second protrusion extends in the circumferential direction and has a circumferential length that corresponds to 90 degrees about the center of the main body, and wherein each of the first separation space and the second separation space has a circumferential length that corresponds to 90 degrees about the center of the main body.

3. The valve actuator of claim 2, wherein a circumferential length of each of the plurality of second holes corresponds to 90 degrees about the center of the main body, and wherein a circumferential length of the first hole between the plurality of second holes corresponds to 90 degrees about the center of the main body.

4. The valve actuator of claim 1, wherein the plurality of protrusions include a first protrusion, a second protrusion, a third protrusion, and a fourth protrusion that are spaced apart from one another in the circumferential direction and arranged about a center of the main body such that a first separation space, a second separation space, a third separation space, and a fourth separation space are defined between adjacent two protrusions among the first protrusion, the second protrusion, the third protrusion, and the fourth protrusion, wherein each of the first protrusion, the second protrusion, the third protrusion, and the fourth protrusion extends in the circumferential direction and has a circumferential length corresponding to 45 degrees about the center of the main body, and wherein each of the first separation space, the second separation space, the third separation space, and the fourth separation space has a circumferential length corresponding to 45 degrees about the center of the main body.

5. The valve actuator of claim 4, wherein a circumferential length of each of the plurality of second holes is 135 degrees about the center of the main body, and wherein a circumferential length of the first hole between the plurality of second holes corresponds to 45 degrees about the center of the main body.

6. The valve actuator of claim 1, wherein the motor comprises a direct current (DC) motor.

7. The valve actuator of claim 1, wherein the main body of the output shaft defines a groove at an upper end thereof.

8. The valve actuator of claim 1, wherein at least a portion of upper ends of the plurality of protrusions has a tapered or curved shape.

9. The valve actuator of claim 1, wherein the output gear has an upper region that is configured to contact the upper plate of the housing based on the output shaft rotating by the predetermined angle.

10. The valve actuator of claim 1, wherein an upper end of the main body of the output shaft is disposed above an upper end of the plurality of protrusions.

11. A valve actuator comprising:
a housing comprising an upper plate and a lower plate that are spaced apart from each other in a vertical direction;
a motor disposed at the housing, the motor comprising a motor shaft;
a driving gear coupled to the motor shaft of the motor;
an output shaft comprising a main body and a plurality of protrusions, the plurality of protrusions radially protruding from the main body and being spaced apart from each other in a circumferential direction of the main body;
an output gear that is coupled to the output shaft and in contact with the driving gear;
a stopper disposed in the housing and configured to limit a rotation angle of the output gear; and
an elastic member disposed between a lower portion of the plurality of protrusions and the lower plate of the housing, the elastic member being configured to push the main body and the plurality of protrusions through the upper plate of the housing to thereby release the output gear from the driving gear based on the output shaft rotating by a predetermined angle,
wherein the upper plate of the housing defines:
a first hole configured to receive the main body in the vertical direction based on the output shaft rotating by the predetermined angle, and
a plurality of second holes that extend in a radial direction from the first hole and are configured to receive the plurality of protrusions based on the output shaft rotating by the predetermined angle.

12. The valve actuator of claim 11, wherein the plurality of protrusions include a first protrusion and a second protrusion that are spaced apart from each other in the circumferential direction and arranged about a center of the main body such that a first separation space and a second separation space are defined between the first protrusion and the second protrusion, wherein each of the first protrusion and the second protrusion extends in the circumferential direction and has a circumferential length that corresponds to 90 degrees about the center of the main body, and wherein each of the first separation space and the second separation space has a circumferential length that corresponds to 90 degrees about the center of the main body.

13. The valve actuator of claim 12, wherein a circumferential length of each of the plurality of second holes corresponds to 90 degrees about the center of the main body, and wherein a circumferential length of the first hole between the plurality of second holes corresponds to 90 degrees about the center of the main body.

14. The valve actuator of claim 11, wherein the plurality of protrusions include a first protrusion, a second protrusion, a third protrusion, and a fourth protrusion that are spaced apart from one another in the circumferential direction and arranged about a center of the main body such that a first separation space, a second separation space, a third separation space, and a fourth separation space are defined between adjacent two protrusions among the first protrusion, the second protrusion, the third protrusion, and the fourth protrusion, wherein each of the first protrusion, the second protrusion, the third protrusion, and the fourth protrusion extends in the circumferential direction and has a circumferential length corresponding to 45 degrees about the center of the main body, and wherein each of the first separation space, the second separation space, the third separation space, and the fourth separation space has a circumferential length corresponding to 45 degrees about the center of the main body.

15. The valve actuator of claim 14, wherein a circumferential length of each of the plurality of second holes is 135 degrees about the center of the main body, and wherein a circumferential length of the first hole between the plurality of second holes corresponds to 45 degrees about the center of the main body.

16. The valve actuator of claim 11, wherein the motor comprises a direct current (DC) motor.

17. The valve actuator of claim 11, wherein the main body of the output shaft defines a groove at an upper end thereof.

18. The valve actuator of claim 11, wherein at least a portion of upper ends of the plurality of protrusions has a tapered or curved shape.

19. The valve actuator of claim 11, wherein the output gear has an upper region that is configured to contact the upper plate of the housing based on the output shaft rotating by the predetermined angle.

20. The valve actuator of claim 11, wherein an upper end of the main body of the output shaft is disposed above an upper end of the plurality of protrusions.

* * * * *